United States Patent [19]
Frimberger

[11] 3,780,446
[45] Dec. 25, 1973

[54] AUTOMATIC HOPPER LOADER
[75] Inventor: Herbert H. Frimberger, Middlefield, Conn.
[73] Assignee: Polymer Machinery Corp., Berlin, Conn.
[22] Filed: July 25, 1972
[21] Appl. No.: 274,985

[52] U.S. Cl. .................................. 34/57 R, 302/22
[51] Int. Cl. ............................................ F26b 17/10
[58] Field of Search .................... 34/10, 57 R, 57 A; 432/15, 58; 302/22, 26

[56] References Cited
UNITED STATES PATENTS
3,597,850   8/1971   Jenkens ................................. 34/10
2,916,831   12/1959   McCosh ............................. 34/57 A Primary Examiner—William F. O'Dea
Assistant Examiner—William C. Anderson
Attorney—George H. Spencer et al.

[57] ABSTRACT
An apparatus for automatically supplying plastic material to the closed hopper of an injection molding machine or the like, the hopper being provided with an air drying arrangement, including a suction blower, for drying the air and thus the plastic material in the hopper. The plastic material to be supplied to the hopper is maintained in a supply bin which is open at its upper end. A suction wand, including a pair of space concentric tubes which are open at one end, extends into the bin to a point below the level of the plastic material. The other end of the inner one of the pair of concentric tubes is connected to the interior of the hopper adjacent the upper end thereof for conveying the plastic material thereto, while the other end of the outer one of the pair of concentric tubes is connected to the outlet air tube of the drying arrangement, and hence the outlet of the suction blower. Finally, a valve arrangement is connected in the outlet tube from the suction blower. The valve arrangement is such that when it is in a normal first position, the outlet stream of air from the drying device passes into the hopper via the outlet tube of the suction blower, and when it is in a second position the flow path to the hopper via the outlet tube is closed off and the output stream of air from the drying device is conducted via the outer tube of the suction wand into the supply bin where it is drawn together with the plastic material, via the inner tube of the suction wand into the hopper.

10 Claims, 2 Drawing Figures

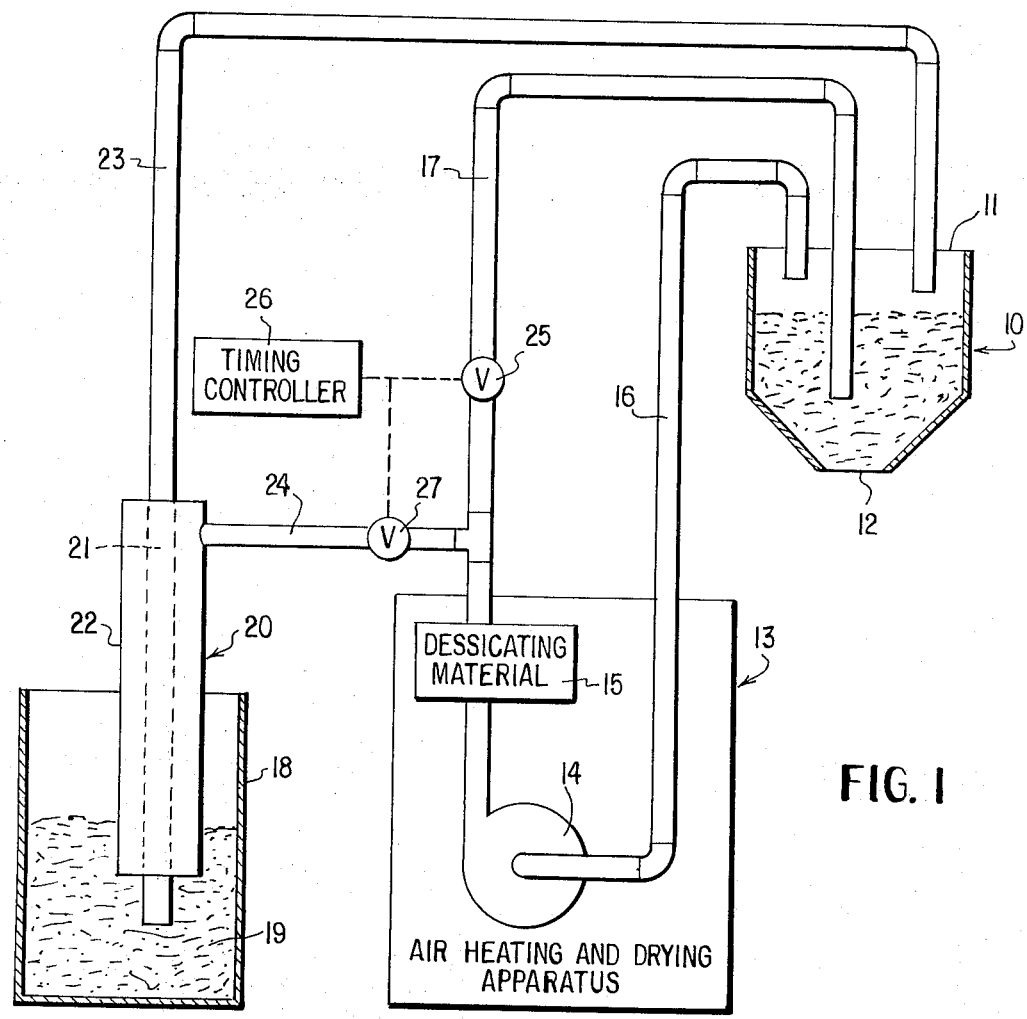
FIG. 1
FIG. 2
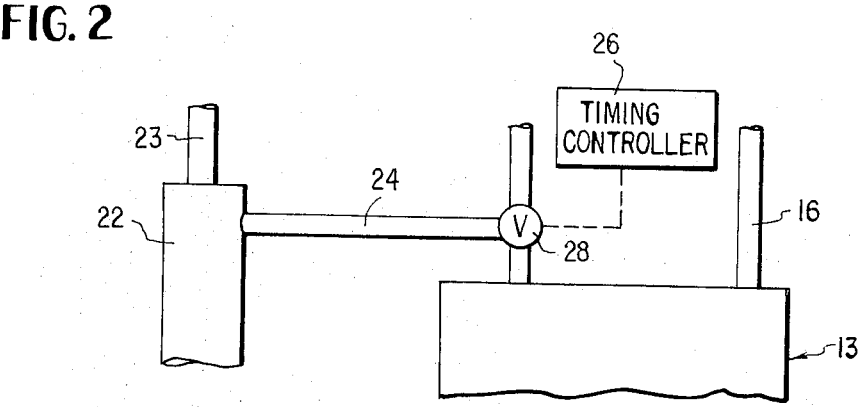

AUTOMATIC HOPPER LOADER

BACKGROUND OF THE INVENTION

The present invention relates to an apparatus for supplying plastic material to the hopper of an injection molding machine or the like. More particularly, the present invention relates to an apparatus for automatically feeding plastic material to the hopper of an injection molding machine or the like, which hopper is provided with a drying device for continuously circulating and drying the air within the hopper, and thus drying the plastic material.

As the plastic material in the supply hopper of injection molding machines or the like is used, it is obviously necessary that the material in the hopper be replenished so that the machine may continuously operate. Although such may be done manually, it is preferable that the feeding of plastic material to the hopper be done automatically. A number of devices for the automatic feeding of plastic material to a hopper have been proposed. Generally such feeding devices operate on the vacuum or pressure principle and utilize air as the conveying means for the plastic material from a supply bin to the hopper. These systems thus require either a separate compressor or vacuum producing arrangement which are relatively expensive. Additionally, in the known vacuum or pressure operative feeding devices the cold air in the room in which the supply bin and/or the injection molding machine is located is unavoidably introduced into the hopper. Such introduction of the cold room air into the hopper is undesirable since such both decreases the temperature of the material in the hopper and introduces undesirable moisture into the plastic material.

Since as indicated above, it is desirable to control the moisture content of the plastic material in the hopper of an injection molding machine or the like, it is conventional to close off the upper end of such hoppers and to provide same with a hot air and dessicating dryer which continuously circulates hot dry air through the hopper. Such dryers generally include a suction blower whose inlet is connected to the interior of the hopper via a hose for evacuting the air therein. The air exiting from the outlet of the suction blower is heated and preferably passed through a bed of a dessicant material to remove the moisture therein, and then returned to the hopper. Thus, as can easily be appreciated, the hopper is generally already supplied with a pressure or vacuum operated air flow system.

SUMMARY OF THE INVENTION

It is therefore the object of the present invention to provide an improved apparatus for automatically supplying plastic material to the hopper of an injection molding maching or the like, which apparatus avoids the introduction of cold room air into the hopper and which require a minimum of additional parts.

The above object is achieved according to the present invention by providing the supply bin for the plastic material to be conveyed to the hopper with a suction wand whose output is connected to the hopper and whose input is connected to the output of the drying device whereby the hot dry air emanating from the drying device is used to convey the plastic material to the hopper. The suction wand includes a pair of spaced concentric tubes which are open at one end thereof and extend into the supply bin below the level of the plastic material contained in the bin. The other end of the inner one of the pair of concentric tubes, which constitutes the output of the suction wand, is connected to the interior of the hopper adjacent the upper end thereof, while the outer one of the pair of concentric tubes of the suction wand is connected to the outlet of the drying device. In order to control the supply of material from the supply bin to the hopper, a valve is connected in the air tube connecting the outlet of the drying device to the hopper and is located between the hopper and the point where the outer one of the concentric tubes of the suction wand is connected. Closure of the valve will thus direct the air coming from the drying device to the suction wand and into the supply bin where it will be drawn together with the plastic material through the inner tube of the suction wand and into the hopper. Preferably, the output of the drying device is connected to the hopper via a flexible tube and the valve is a pinch valve.

According to a further feature of the invention, means are provided for periodically automatically closing the valve so as to cause plastic material to be fed into the hopper.

BRIEF DESCRIPTION OF THE DRAWINGS

FIG. 1 is a schematic illustration of the automatic feeding apparatus according to the invention.

FIG. 2 is a schematic illustration of a portion of the apparatus of FIG. 1 showing a modification thereof.

DESCRIPTION OF THE PREFERRED EMBODIMENTS

Referring now to FIG. 1, there is shown a hopper 10 for an injection molding machine or the like. The upper end of the hopper 10 is closed by a top cover 11, while the lower end of the hopper is provided with a discharge opening 12 though which the plastic material contained in the hopper is fed to the injection molding machine or the like.

In order to dry the air within the hopper 10, and consequently the plastic material contained therein, as is conventional in the art an air drying device 13 is connected to the hopper 10. The drying device 13 essentially consists of a suction blower or fan 14, a bed of molecular sieve dessicating material 15 and an air heating device (not shown). The input of the suction blower 14, and hence of the drying device 13, is connected to the hopper via a tube or hose 16 which opens into the hopper 10 adjacent the upper end thereof. The air blown out by the suction blower 14 is passed through the bed of dessicating material and then returned to the hopper 10 via a tube or hose 17, which as illustrated terminates in the interior of the hopper 10 at a point below the normal level of the plastic material in the hopper. The drying device 13, the hopper 10 and the connecting pipes or tubes 16 and 17 thus form a closed circulating air system. That is, the air in the hopper 10 is withdrawn therefrom via the tube 16 by the suction blower 14 whose output stream is passed through the dessicating material 15, heated, and finally returned to the hopper 10 via the tube or pipe 17.

In order to automatically supply plastic material to the hopper 10 so as to maintain the level of the material in the hopper 10 at a desired level, the supply bin 18 in which the plastic material 19 to be conveyed is contained is provided with a suction wand 20. The suction wand 20 is formed of a pair of concentric pipes or tubes 21 and 22 which are open at the lower end thereof.

Preferably, as is indicated, the inner tube or pipe 21 extends axially beyond the end of the outer tube or pipe 22. The suction wand 20, which as illustrated is vertically oriented, extends in to the supply bin 18 through its open upper end so that the open ends of the tubes 21 and 22 are positioned at a point which is below the level of the plastic material 19 contained in the bin 18. The upper end of the inner tube 21 of the suction wand 20 is connected to the hopper 10 via a further tube or pipe 23 which serves as the plastic material conveying or feeding tube for the apparatus and which terminates in the hopper 10 adjacent the upper end thereof. The upper end of the outer tube 22 of the suction wand 20 is connected via a section of tubing or pipe 24 to the dry air supply tube 17. Connected in the dry air supply tube 17 between the hopper 10 and the junction of the tube 24 with the tube 17 is a normally open shut off valve 25. Preferably, the tube 17 is formed of flexible material in which case the valve 25 may be a pinch valve, for example of the pneumatically operated type. Closure of the valve 25 will, in a manner to be explained below, causes sufficient plastic material contained in the supply bin 18 to be drawn into the hopper 10 to again fill same to a predetermined level. In order to insure that sufficient plastic material is always present in the hopper 10, a timing control device 26 is provided for the valve 25. The timing control device 26 controls the valve 25 so that it is cyclically closed at fixed intervals for a fixed predetermined time. For example, the timing control device 26 may be set so that the valve 25 is closed for twenty seconds every 10 minutes.

The automatic feeding arrangement according to the invention operates as follows. Initially, with the valve 25 open, warm dry air is being continuously circulated through the hopper 10 via the flow path formed by the tube 16, the drying device 13, and the tube 17. Whenever the valve 25 is closed by means of the timing control 26, the supply of air through the hopper 10 via the tube 17 is shut off, and the dry air emanating from the drying device 13 is then directed via the tube or pipe 24 and the outer tube 22 of the suction wand 20 to the supply bin 18. Since the suction blower 14 of the drying device 13 continues to exhaust or withdraw the air in the closed hopper 10, a partial vacuum is produced in the hopper 10 resulting in a pressure differential between the outlet end of the tube 23 which is in the hopper 10 and the inlet end of the tube 23 in the supply bin 18. The force resulting from this pressure differential will cause the plastic material 19 in the supply bin 18 to be drawn up through the inner tube 21 of the suction wand 20 and the tube or pipe 23 into the hopper 10, and thus completing the circulation path for the flow of air into and out of the hopper. As the level of the material in the hopper builds up toward the outlet end of the pipe 23, which constitutes the feed inlet to the hopper 10, the partial vacuum in the hopper 10 will drop, thereby reducing the above mentioned pressure differential and consequently the suction force being exerted on the plastic material 19 in the supply bin 18. When the level of the plastic material in the hopper 10 has reached a point such that the suction force caused by the pressure differential is below that force necessary to draw the plastic material through the tubes 21 and 23, feeding of the plastic material will automatically cease, even though the valve 25 remains closed. Upon the opening of the valve 25 by the timing controller 26 after the preset duration, the air circulation will return to its normal path to the hopper via pipe 17. No feeding of plastic material to the hopper 10 takes place in this condition since the valve 25 is opened and equal pressure is present at the open ends of both of the tubes 21 and 22 of the suction wand 20.

It has been found that under certain conditions, a suction force will be produced in the tube or pipe 24 when the valve 25 is open. Such a suction force is, of course, undesirable since it will tend to draw unwanted cold or relatively moist room air into the tube 17 via the outer tube 22 of the suction wand. In order to avoid this possibility, according to a further feature of the invention, a further shut-off valve 27, which is also controlled by the timing controller 26, is inserted into the tube 24. The valve 27 is controlled by the timing controller 26 so that it is open when the valve 25 is closed and closed when the valve 25 is open. Thus when the valve 27 is closed, the outer tube 22 of the suction wand 20 is isolated from the tube 17 and it is ensured that no cold room air can enter the system via this route. It is of course to be understood that if desired, the two valves 25 and 27 and their functions can be replaced as shown in FIG. 2 by a single two-way valve 28 located at the junction of the tubes 17 and 24 which in its first normal position permits the pressurized air coming from the drying device 13 to pass to the hopper 10 while closing off the tube 17, and in its second position, i.e. when feeding of material 19 to the hopper 10 is desired, permits the pressurized air coming from the drying device 13 to pass into the tube 24 while closing off the flow to the hopper via the tube 17. It is further to be understood that, if desired, a further valve (not shown) which operates in complete synchronism with the valve 27 may be inserted into the tube 23 to completely isolate the hopper 10 from the suction wand 20 during the time that feeding of material to the hopper 10 is not desired.

It will be understood that the above description of the present invention is susceptible to various modifications, changes and adaptations, and the same are intended to be comprehended within the meaning and range of equivalents of the appended claims.

I claim:

1. An apparatus for automatically supplying plastic material to the hopper of an injection molding machine or the like wherein said hopper is a closed hopper having an outlet at the bottom thereof and is provided with an air drying means, including a suction blower, for drying the air and thus the plastic material in said hopper, said drying means having an inlet tube with one end thereof opening into said hopper adjacent the upper end thereof and its other end connected to the inlet of said blower, and an outlet tube having one end thereof connected to the outlet of said drying means and the other end thereof opening into said hopper for returning dry air thereto, said automatic conveying means comprising:

a supply bin for the plastic matrial to be conveyed to said hopper, said supply bin being open at its upper end;

a suction wand including a pair of spaced concentric tubes which are each open at one end thereof, the open ends of said tubes of said suction wand extending into said supply bin to a point below the level of the plastic material contained therein;

a plastic material conveying tube connecting the other end of the inner one of said pair of concentric tubes to the interior of said hopper adjacent the upper end thereof;

an air tube connecting the other end of the outer one of said pair of concentric tubes to said outlet tube of said drying means; and a valve means connected in said outlet tube from said drying means for permitting the outlet stream of air from said drying means to pass into said hopper via said outlet tube when said valve means is in a first position, and for preventing said outlet stream of air from passing into said hopper via said outlet tube while permitting said outlet stream of air to pass into said air tube when said valve means is in a second position whereby when said valve means is in said second position the outlet stream of air from said drying means will be conducted via said air tube and said outer one of said pair of tubes forming said suction wand into said supply bin and will then be drawn, together with the plastic material in said supply bin, via said inner tube of said suction wand and said plastic material conveying tube into said hopper.

2. The apparatus defined in claim 1 wherein said inner one of said pair of tubes of said suction wand extends axially beyond said outer one of said pair of tubes.

3. The apparatus defined in claim 2 wherein said suction wand is vertically oriented.

4. The apparatus as defined in claim 3 wherein said outlet tube of said drying means is a flexible tube and said valve means is a normally open pinch valve connected in said outlet tube between said hopper and the junction of said air tube and said outlet tube; and further including control means for periodically closing said valve to cause plastic material to be fed to said hopper.

5. The apparatus defined in claim 1 wherein said valve means is a valve which is normally in said first position and is connected in said outlet tube between said hopper and the junction of said air tube and said outlet tube.

6. The apparatus defined in claim 5 wherein said outlet tube of said drying means is a flexible tube and wherein said valve is a pinch valve.

7. The apparatus defined in claim 1, wherein said valve means is normally in said first position and further including control means for periodically automatically moving said valve means to said second position so as to cause plastic material to be fed to said hopper.

8. The apparatus defined in claim 1 wherein said valve means simultaneously closes off said air tube when said valve means is in its first position.

9. The apparatus defined in claim 8 wherein said valve means includes a first normally open valve connected in said outlet tube between said hopper and the junction of said air tube and said outlet tube, and a second normally closed valve connected in said air tube; an further including control means for and automatically and simultaneously closing said first valve and opening said second valve so as to cause plastic material to be fed to said hopper.

10. The apparatus defined in claim 8 wherein said valve means is a two-way valve connected at the junction of said air tube and said outlet tube, said two-way valve normally being in said first position; and further including control means for periodically moving said two-way valve to said second position so as to cause plastic material to be fed to said hopper.

* * * * *